April 21, 1959 E. T. J. TAPP ET AL 2,882,984
MOUNTINGS FOR DRIVEN WHEELS OF MOTOR VEHICLES
Filed July 22, 1955 7 Sheets-Sheet 2
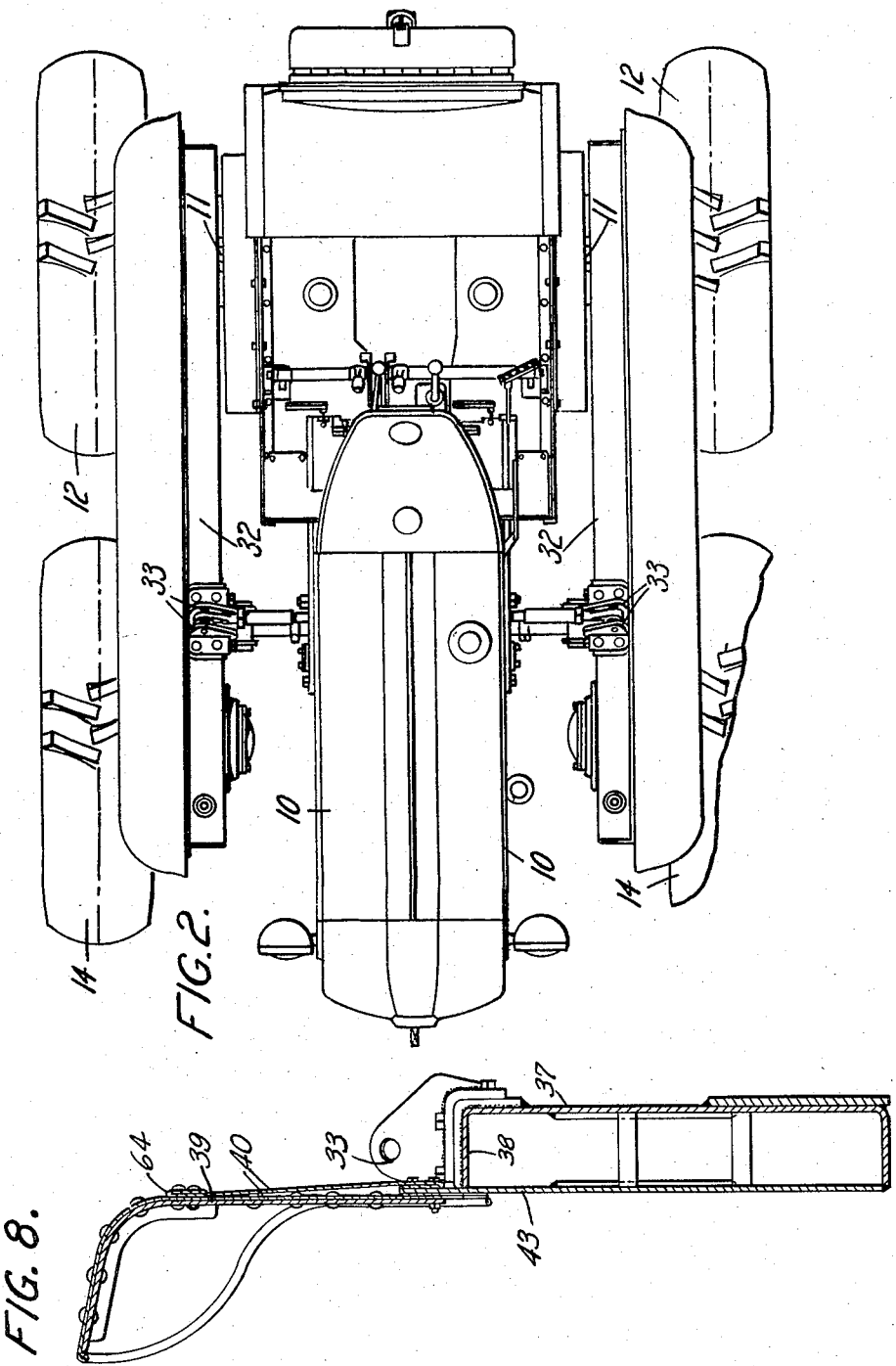

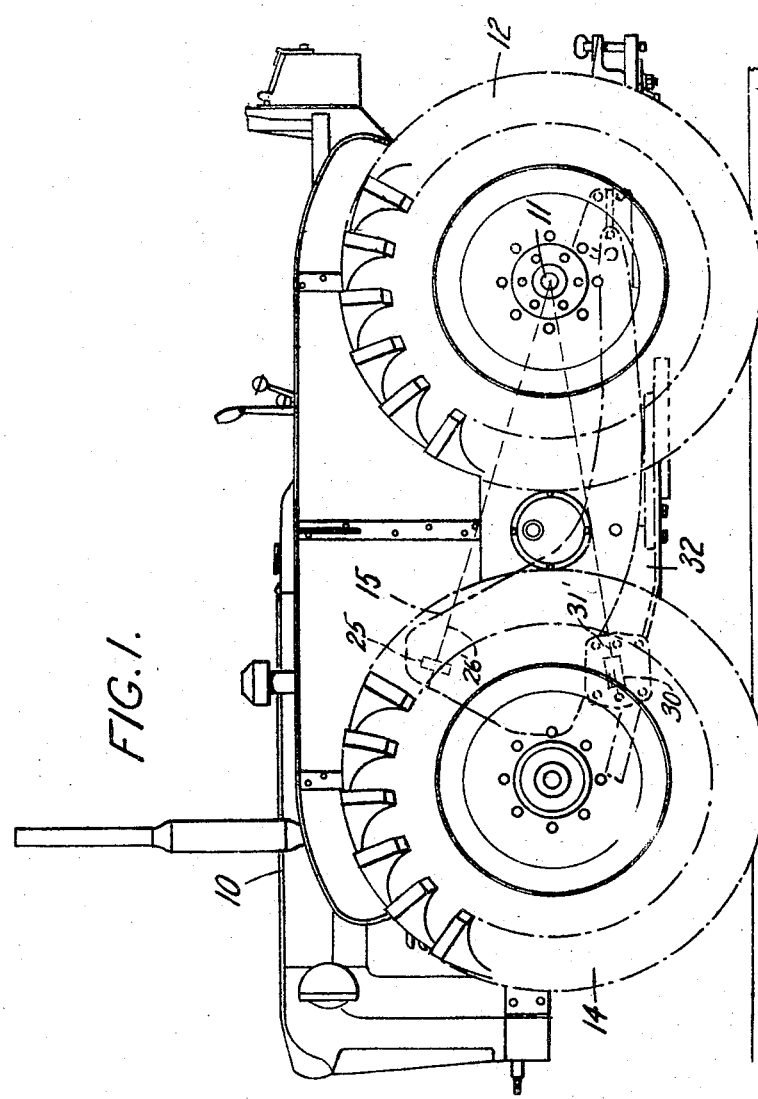

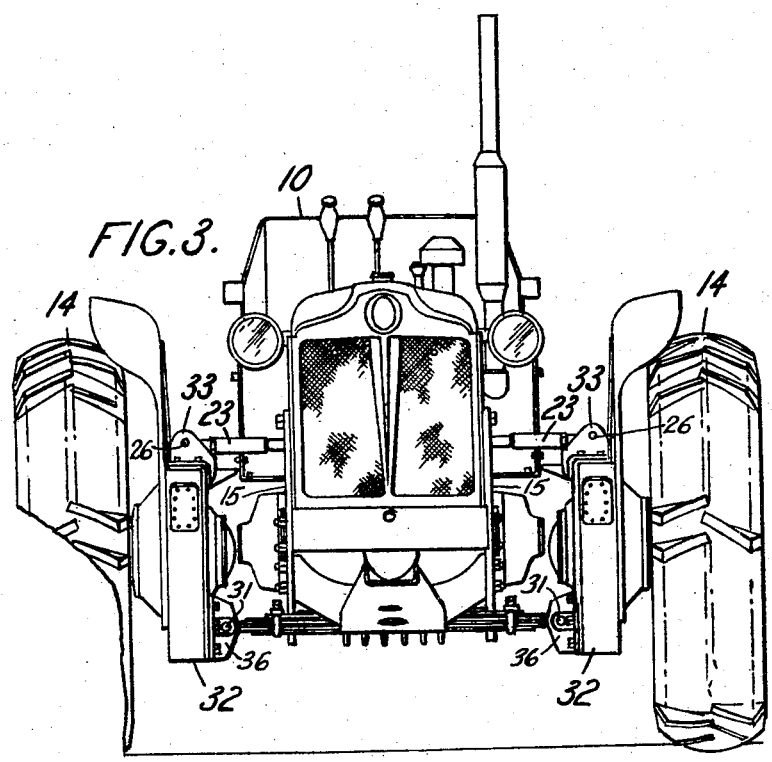
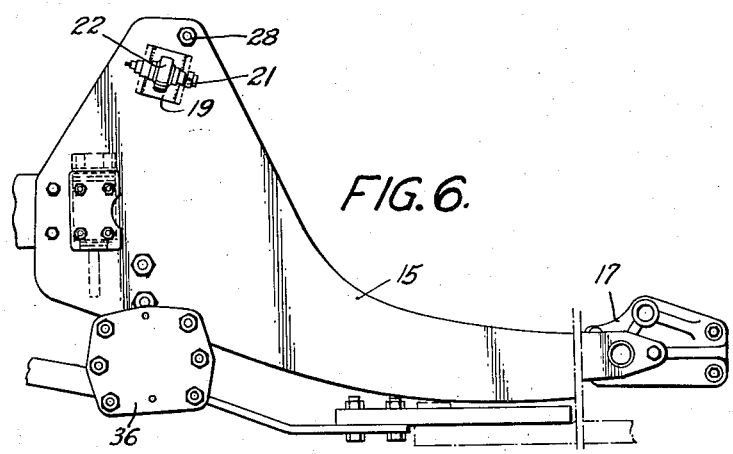

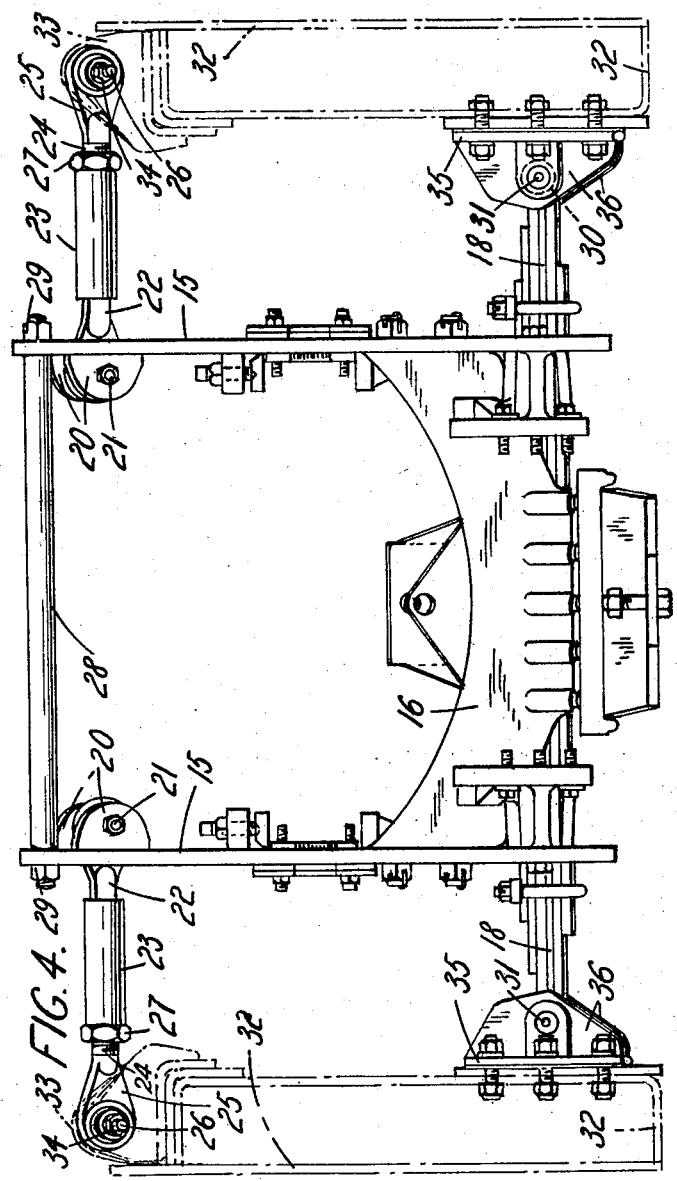

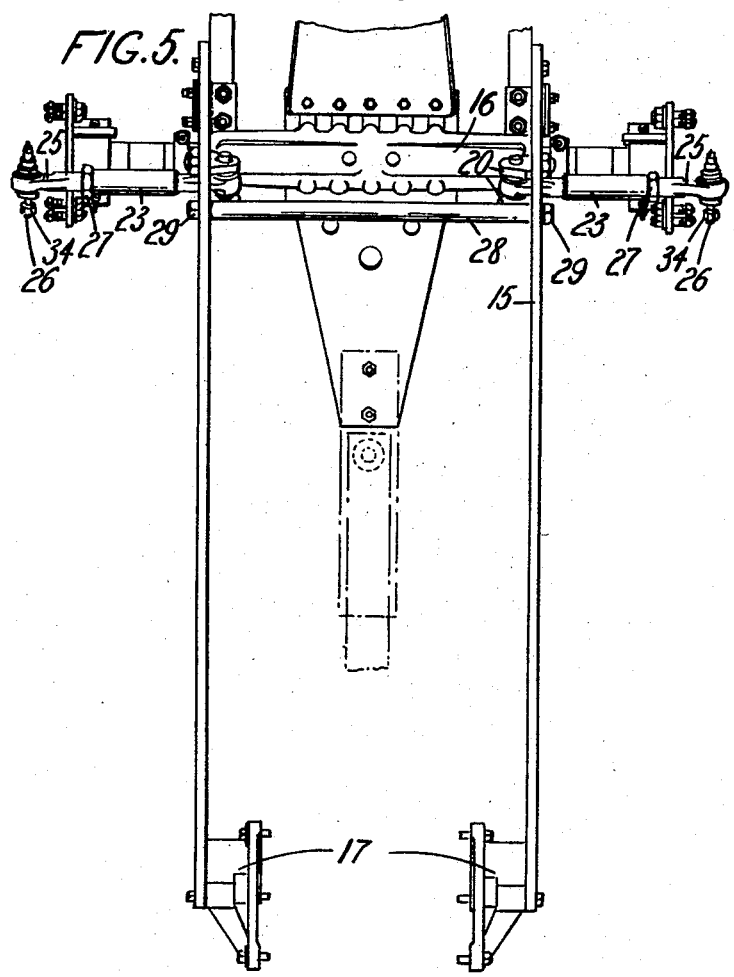

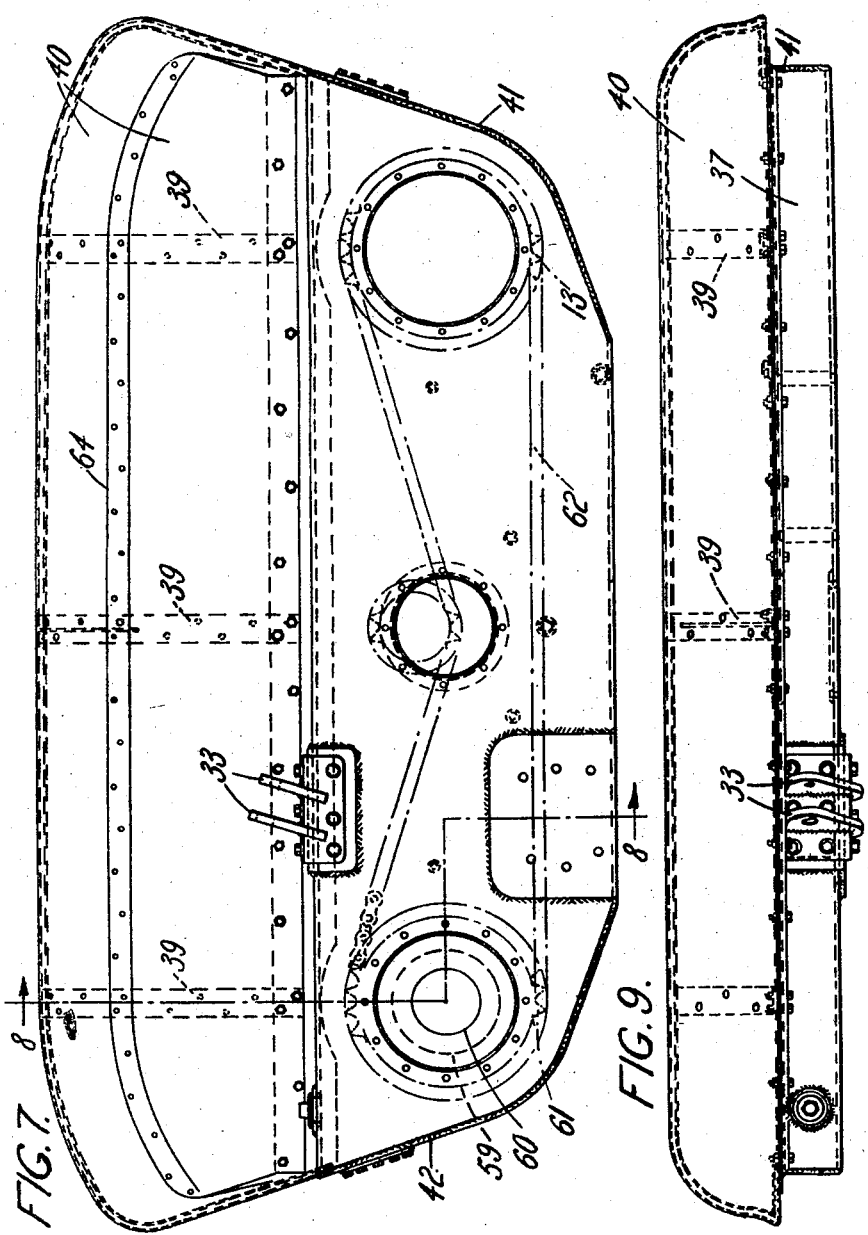

United States Patent Office
2,882,984
Patented Apr. 21, 1959

2,882,984
MOUNTINGS FOR DRIVEN WHEELS OF MOTOR VEHICLES

Ernest Thomas James Tapp and Joseph Davey, Fleet, Aldershot, England, assignors to County Commercial Cars Limited, Aldershot, England, a British company Application July 22, 1955, Serial No. 523,910

12 Claims. (Cl. 180—1)

This invention relates to mountings for driven wheels of motor vehicles, particularly tractors, and of the kind in which a number of driven wheels are disposed apart in a fore and aft direction on either side of the vehicle.

An object of the invention is to provide a vehicle in which two of the wheels are driven from the engine through a conventional transmission and these wheels transmit a drive through other transmissions to the other two wheels which are mounted on carriers which can both swing about the axes of the first said wheels and rock about a fore and aft axis and are supported by springs connected to the vehicle.

A further object of the invention is to provide a universal joint between each said wheel carrier and an axle structure associated with said wheels which universal joints permit up and down swinging movement of said wheel carriers and rocking movement about fore and aft axes.

Yet a further object of the invention is to form said wheel carriers as casings which enclose the transmissions between said wheels and to construct the universal joints so that they form sealing means for the casings.

The following is a more detailed description of the invention as applied to a four wheeled tractor of the kind in which the engine crank case and the back axle assemblage are formed as a unit, reference being made to the accompanying drawings in which:

Figure 1 is a side elevation of the tractor;

Figure 2 is a plan of the arrangement shown in Figure 1;

Figure 3 is a front elevation;

Figure 4 is a more detailed front elevation of the chain cases and their attachments to the tractor;

Figure 5 is a plan view of the arrangement shown in Figure 4, omitting the chain cases;

Figure 6 is a side elevation of one of the plates of the mounting, and which is arranged for attachment to the tractor body or chassis;

Figure 7 is a side elevation of the chain case and mud guard unit;

Figure 8 is an end elevation of the arrangement shown in Figure 7, looking from the left of that figure;

Figure 9 is a plan view of the chain case shown in Figure 7, and

Figure 10:
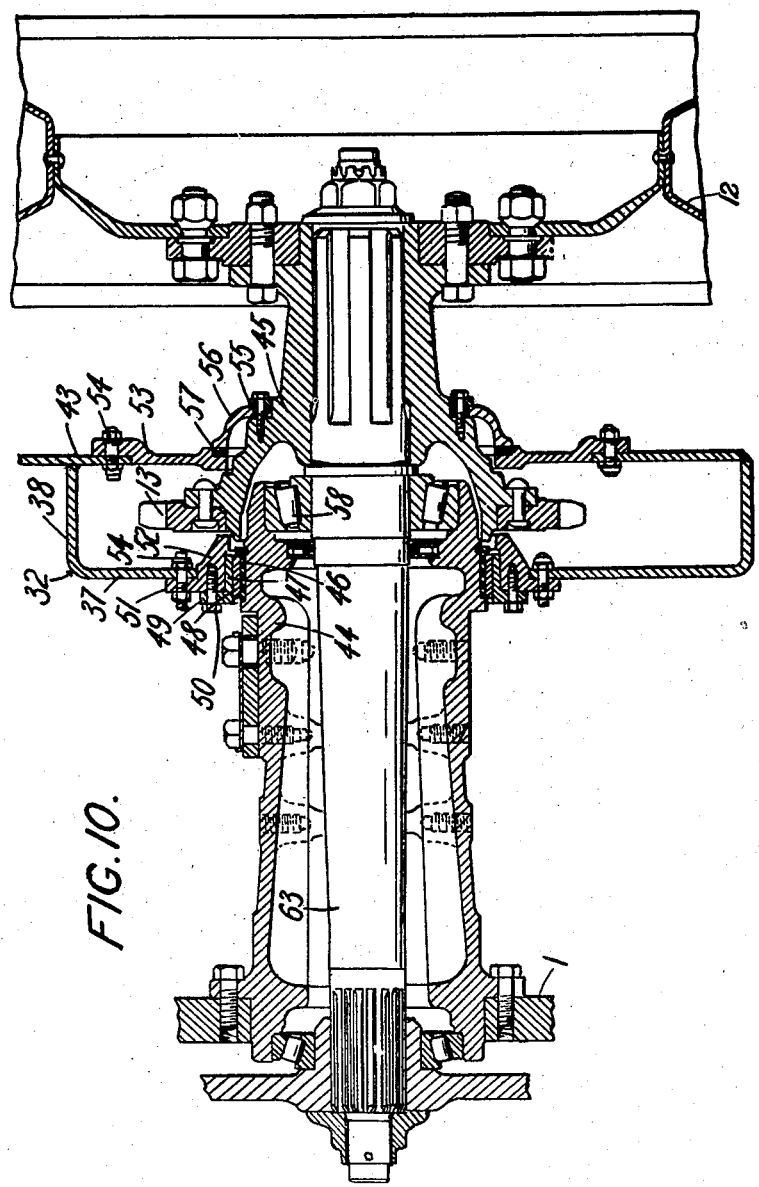
Figure 10 is a section through one of the half shafts of the back axle and through the chain casing.

As will be seen from Figures 1 to 3 the tractor comprises a body chassis 10 incorporating an engine and having a back axle assemblage 11 projecting on either side thereof and driving rear wheels 12. Each of the rear wheels has associated therewith as explained later a sprocket 13 for driving the front wheels 14. Arranged on opposite sides of the body chassis 10 are two upright side plates 15 extending in a fore and aft direction and which have secured between them towards the forward end thereof, and near their lower edges, a cradle 16 arranged to support the body chassis unit. The rear ends of the side plates 15, see Figures 4 to 6, are provided with brackets 17 on their inner faces for attachment to another part of the body or chassis. Secured to the cradle is a cross member 18 which may be in the form of a leaf spring as shown, the ends of which project beyond the outer sides of the aforesaid upright plates 15. Each of the plates immediately above the spring or cross bar is provided near its upper edge with an aperture 19, and extending inwardly from the plates on either side of the aperture are two lugs 20 drilled to receive a pivot pin 21. One end 22 of a link extends through each aperture and is provided with a bearing hole which is engaged by the pivot pin 21. Each link may comprise a rod 23 which is provided with an internally threaded bore at the opposite end to that which is attached to the side plates, which bore is engaged by a threaded element 24 having a flattened outer end 25 drilled to receive another pivot pin 26. By these means the length of each link is adjustable. A lock nut 27 engages the threaded part for maintaining the adjustment.

A tie rod 28 is arranged between the upper part of the two plates close to the pivotal attachments of the links, the ends of the tie rods being screw threaded and extending through holes in the side plates 15 and receiving clamping nuts 29 whereby the side plates 15 are drawn against shoulders formed on the tie rods.

The ends of the leaf spring 18 are provided with eyes 30 for accommodating pivot pins 31 so that the axes of the eyes and pivot pins extend in a forward and rearward direction.

Disposed on the outside of each side plate is a transmission casing 32 constituting a carrier for a front wheel extending in a fore and aft direction, the top of each casing being provided with two upwardly extending lugs 33 which straddle the adjustable end 25 of one of the links and which lugs 33 are drilled to receive the pivot pin 26. Each pivot may be in the form of a bolt having a nut 34 for holding it in position. Bolted to the inner face of each transmission casing 32 near the lower end thereof, is a bracket 35 having portions 36 which straddle the eye 30 at the end of the leaf spring, which portions are drilled to receive the pivot pin 31. In the case of a rigid cross bar its ends are also attached to the brackets. In either case the effective length of the spring or cross bar may be varied by inserting shims between the brackets 35 and the inner face of the transmission. By these means and by adjusting the adjustable links the correct tracking of the vehicle wheels may be obtained. The axes of the various pivot pins 21, 26, 31 (see Figure 1) and the axes of the holes in the lugs 20, 33 and of the eyes 30 which receive said pivot pins are so arranged that they intersect or nearly intersect the axis of the back axle. By reason of the fact that the axes extend in a general fore and aft direction the casing is capable of limited sideways rocking motion. The outer wall 43 of each casing extends above the upper wall 38 and secured on either side of this upwardly extending portion are the two sheets of a double thickness mudguard 40 (see Figures 7, 8 and 9). The sheets are secured to upwardly extending reinforcing members 39 also which are fixed to the upwardly extending portion of the wall 43, to the left of the mudguard seen in Figure 8. One of the sheets stops short of the upper limit of the mudguard as indicated by the line 64 (Figure 7). Two end plates 41 and 42 are secured respectively between the ends of the side walls, which end plates extend upwardly in an inclined manner so that the casings can ride over obstacles. The rear end of each transmission casing is mounted so that it can oscillate about the back axle assemblage, for this purpose the two spaced inner and outer walls 37 and 43 are provided with apertures. An axle casing 44 (see Figure 10) is arranged to extend through the aperture in said inner wall 37. A hub 45 is secured to each outer end of the axle 63 and a part of the hub projects into the transmission casing while part of the hub outside the casing has the road wheel 12 attached thereto. The casing is secured to the axle casing 44 by a universal joint comprising inner and outer rings 46, 47 between which is bonded a rubber ring 48. The inner ring is fixed to the axle casing and the outer ring is provided with a flange 49 which is bolted by bolts 50 to an intermediate ring 51 having a part 52 extending into the casing and a flange overlying the outer face of the inner side wall 37 of the casing to which it is bolted by bolts 54.

The aperture in the outer side wall of the transmission casing is closed by a plate 53 having a hole therein through which a part of the hub 45 extends, the outer portion of the plate being secured to the casing by bolts 54. The portion of the hub outside the casing is provided with a shoulder 55, against which is clamped, the inner peripheral portion of a rubber ring 56. The outer portion of the rubber ring has bonded to it, a metal annulus 57 having a face transverse to the axis of the shaft, which face is provided with concentric grooves and projections which interengage similar grooves and projections formed in the outer face of the closure ring 53.

The end of the axle casing 44 within the transmission casing is provided with a suitable bearing 58 supported by shaft 63 and this part of the axle casing is encircled by the inner end of the hub 45 to which is secured the aforesaid sprocket wheel 13 opposite the bearing 58. The forward end of the transmission casing is provided with bearings 59 on the inner and outer walls 37, 43 in which is rotatably mounted a shaft 60 carrying the front wheel 14. The shaft has fixed to it a second sprocket wheel 61 and the two sprocket wheels are encircled by a chain 62. The aforesaid pivotal connections for the links 23 and the ends of the springs or cross bar 18 are so disposed as to lie between the front and back wheels. The rubber 48 of the universal joint permits the chain casing to oscillate about the axis of the main driving shaft, and also tilt about a fore and aft axis.

We claim:

1. A motor vehicle comprising a chassis, an engine, an axle structure connected to and extending across said chassis, two land wheels mounted on the axle structure on opposite sides of the chassis, a transmission between said wheels and the engine, two other land wheels on opposite sides of the chassis and longitudinally spaced from the first said wheels, a carrier for each of said other wheels extending longitudinally of and spaced from said chassis, a cross member fixed to the chassis and spaced from the axle structure, a pivotal connection between each end of the cross member and a corresponding carrier, the pivot axis of which connection extends in a forward and rearward direction so as to permit the carrier to rock sideways, a universal joint connecting each carrier to said axle structure so as to permit both said rocking movement and swinging movement of the carrier about the axis of said axle structure, a laterally extending link pivoted at its ends to said chassis and said carrier respectively and a driving transmission extending along each said carrier and between the two land wheels thereon.

2. A motor vehicle according to claim 1 wherein said link between each carrier and chassis is adjustable in length.

3. A motor vehicle according to claim 1 wherein said cross member and link are disposed between the two pairs of land wheels and nearer the wheels remote from the axle structure.

4. A motor vehicle according to claim 1 wherein said cross member comprises a leaf spring.

5. A motor vehicle according to claim 1 wherein the axes of the pivotal connections between the link and the chassis and carrier and between the cross member and said carrier all intersect the axis of the axle structure.

6. A motor vehicle according to claim 1 wherein each said carrier comprises a casing enclosing a transmission between the two land wheels on one side of the vehicle, which transmission transmits rotation from one land wheel to the other, the ends of which casing diverge as they extend upwardly so that the casing may ride over obstructions on the ground.

7. A motor vehicle according to claim 1 wherein each said carrier comprises a casing enclosing a transmission between the two land wheels on one side of the vehicle, which transmission transmits rotation from one land wheel to the other said casing and acts as a mudguard for these two wheels.

8. A motor vehicle according to claim 1 wherein said universal joint comprises two rings arranged one within the other between which is bonded a rubber sleeve, the inner one of which is carried by the axle structure and the outer is fixed to the carrier.

9. A motor vehicle according to claim 1 wherein said axle structure comprises two half axles each surrounded by an axle casing and each of which axles extends from its axle casing and is fixed to a wheel and wherein the wheel carrier is connected by said universal joint to the axle casing.

10. A motor vehicle according to claim 1 wherein each said carrier comprises a casing enclosing a transmission between the two land wheels on one side of the vehicle, which transmission transmits rotation from one land wheel to the other and wherein said axle structure comprises two half shafts each surrounded by an axle casing which axle casing projects into a carrier casing to which it is connected by said universal joint and wherein a part of the wheel also projects into said casing and a flexible seal is provided between said part and casing.

11. A motor vehicle according to claim 1 wherein each said carrier comprises a casing enclosing a transmission between the two land wheels on one side of the vehicle, which transmission transmits rotation from one land wheel to the other and wherein said axle structure comprises two half shafts each surrounded by an axle casing which axle casing projects into a carrier casing to which it is connected by said universal joint and wherein a part of the wheel also projects into said casing and a resilient sleeve connected at one end to said part of the wheel and at the other end is connected to a metal ring having a face arranged opposite a side face of said carrier casing which opposed faces are formed with interengaging concentric grooves and projections.

12. A motor vehicle according to claim 1 wherein each said carrier comprises a casing enclosing a transmission between the two land wheels on one side of the vehicle, which transmission transmits rotation from one land wheel to the other and wherein said axle structure comprises two half shafts each surrounded by an axle casing which projects into the carrier casing and is provided at its end with a bearing supporting its half shaft and which axle casing is connected to the carrier casing by said universal joint and wherein a part of the land wheel also projects into the casing and is shaped to encircle the end of the axle casing and carries a sprocket wheel opposite said bearing which sprocket wheel comprises a part of said transmission.

References Cited in the file of this patent

UNITED STATES PATENTS

| | | |
|---|---|---|
| 1,068,044 | Douglass | July 22, 1913 |
| 1,608,069 | Lacey et al. | Nov. 23, 1926 |
| 1,724,166 | Bager | Aug. 13, 1929 |
| 1,817,028 | Brockway | Aug. 4, 1931 |
| 1,945,185 | Eberhard | Jan. 30, 1934 |
| 2,091,464 | Baker et al. | Aug. 31, 1937 |
| 2,135,619 | Johnston | Nov. 8, 1938 |
| 2,352,593 | Allin | July 4, 1944 |
| 2,586,742 | Tapp et al. | Feb. 19, 1952 |